(12) United States Patent
Komai (10) Patent No.: US 7,559,084 B2
(45) Date of Patent: Jul. 7, 2009

(54) AUTHENTICATION INFORMATION PROCESSING METHOD

(75) Inventor: Hiroyuki Komai, Inagi (JP)

(73) Assignee: Fujitsu Limited, Kawasaki (JP)

( * ) Notice: Subject to any disclaimer, the term of this patent is extended or adjusted under 35 U.S.C. 154(b) by 689 days.

(21) Appl. No.: 10/773,338

(22) Filed: Feb. 9, 2004

(65) Prior Publication Data

US 2004/0162982 A1 Aug. 19, 2004

(30) Foreign Application Priority Data

Feb. 14, 2003 (JP) ............................. 2003-037150

(51) Int. Cl.
*H04L 9/32* (2006.01)

(52) U.S. Cl. ............... 726/19; 726/5; 726/6; 726/7; 726/17; 726/18

(58) Field of Classification Search .................. None
See application file for complete search history.

(56) References Cited

U.S. PATENT DOCUMENTS

| | | | |
|---|---|---|---|
| 5,475,839 A * | 12/1995 | Watson et al. ............... 713/2 |
| 5,606,663 A | 2/1997 | Kadooka | |
| 5,774,058 A * | 6/1998 | Henry et al. ............. 340/5.5 |
| 7,079,652 B1 * | 7/2006 | Harris ..................... 380/258 |
| 2003/0131110 A1 * | 7/2003 | Chang et al. ............ 709/227 |
| 2003/0149900 A1 * | 8/2003 | Glassman et al. ........ 713/202 |
| 2004/0059951 A1 * | 3/2004 | Pinkas et al. ............. 713/202 |
| 2004/0148526 A1 * | 7/2004 | Sands et al. ............. 713/202 |

FOREIGN PATENT DOCUMENTS

| | | |
|---|---|---|
| EP | 0 935 221 A2 | 8/1999 |
| JP | 04-277855 | 10/1992 |
| JP | 06-337844 | 12/1994 |
| JP | 07-160638 | 6/1995 |
| JP | 07-182064 | 7/1995 |
| JP | 11-224236 | 9/1999 |
| JP | 2000-036809 | 2/2000 |
| JP | 2000-057097 | 2/2000 |
| JP | 2001-273259 | 10/2001 |

OTHER PUBLICATIONS

Japanese Office Action mailed Apr. 21, 2009 in corresponding Japanese Application No. 2003-037150(3 pages) (5pages English Translation).

* cited by examiner

*Primary Examiner*—Jung Kim
(74) *Attorney, Agent, or Firm*—Staas & Halsey LLP (57) ABSTRACT

Terminal information of a user terminal requesting a log-in is acquired, a log-in procedure to be applied to the user terminal is determined based on the terminal information, a log-in operation based on the determined log-in procedure is accepted, and the log-in from the user terminal is permitted when the log-in operation is right.

3 Claims, 13 Drawing Sheets

| ACCUMULATED LOG-IN COUNT | LEVEL | LOG-IN PROCEDURE |
|---|---|---|
| 1-2 | 5 | LOG-IN PROCEDURE OF LEVEL 5 |
| 3-5 | 4 | LOG-IN PROCEDURE OF LEVEL 4 |
| 6-10 | 3 | LOG-IN PROCEDURE OF LEVEL 3 |
| 11-20 | 2 | LOG-IN PROCEDURE OF LEVEL 2 |
| 21 | 1 | LOG-IN PROCEDURE OF LEVEL 1 |

FIG. 4

| NUMBER OF ELAPSED DAYS | LEVEL | LOG-IN PROCEDURE |
|---|---|---|
| 21– | 5 | LOG-IN METHOD OF LEVEL 5 |
| 11–20 | 4 | LOG-IN METHOD OF LEVEL 4 |
| 6–10 | 3 | LOG-IN METHOD OF LEVEL 3 |
| 3–5 | 2 | LOG-IN METHOD OF LEVEL 2 |
| 1–2 | 1 | LOG-IN METHOD OF LEVEL 1 |

FIG. 5

| FAILURE COUNT | SECURITY LEVEL |
|---|---|
| 0-3 | PRESENT LEVEL MAINTAINED |
| 4 | PRESENT LEVEL + 1 |
| 5 | PRESENT LEVEL + 2 |
| 6 | PRESENT LEVEL + 3 |
| 7- | PRESENT LEVEL + 4 |

| SECURITY | LOG-IN METHOD | LOG-IN COUNT |
|---|---|---|
| LEVEL 5 | INPUTTING OF USER NAME AND PASSWORD, INPUTTING OF KEYWORD, FINGERPRINT AUTHENTICATION, SMART CARD, BUTTON PRESSING PERIOD | 1~2 |
| LEVEL 4 | INPUTTING OF USER NAME AND PASSWORD, INPUTTING OF KEYWORD, FINGERPRINT AUTHENTICATION, SMART CARD | 3~5 |
| LEVEL 3 | INPUTTING OF USER NAME AND PASSWORD, INPUTTING OF KEYWORD, FINGERPRINT AUTHENTICATION | 6~10 |
| LEVEL 2 | INPUTTING OF USER NAME AND PASSWORD, INPUTTING OF KEYWORD | 11~20 |
| LEVEL 1 | INPUTTING OF USER NAME AND PASSWORD | 21 OR ABOVE |

```
                    ┌─ 1b
┌─────────────────────────────────────────────┐
│  ┌───────────────────────────────────────┐  │
│  │    WORK HOURS MANAGEMENT SYSTEM (2/5) │  │
│  └───────────────────────────────────────┘  │
│  ┌───────────────────────────────────────┐  │
│  │    INPUT KEYWORD TO QUESTION          │  │
│  └───────────────────────────────────────┘  │
│                                             │
│   FAVORITE ANIMAL ?                         │
│                                             │
│   KEYWORD: [                            ]   │
│                                             │
│  ─────────────────────────────────────────  │
│                                             │
│   [  RETURN  ]   [  NEXT  ]   [  CANCEL  ]  │
│                                             │
└─────────────────────────────────────────────┘
```

| SECURITY | LOG-IN METHOD | LOG-IN COUNT |
|---|---|---|
| LEVEL 5 | INPUTTING OF USER NAME AND PASSWORD, INPUTTING OF KEYWORD, FINGERPRINT AUTHENTICATION, SMART CARD, BUTTON PRESSING PERIOD | 21 OR ABOVE |
| LEVEL 4 | INPUTTING OF USER NAME AND PASSWORD, INPUTTING OF KEYWORD, FINGERPRINT AUTHENTICATION, SMART CARD | 11~20 |
| LEVEL 3 | INPUTTING OF USER NAME AND PASSWORD, INPUTTING OF KEYWORD, FINGERPRINT AUTHENTICATION | 6~10 |
| LEVEL 2 | INPUTTING OF USER NAME AND PASSWORD, INPUTTING OF KEYWORD | 3~5 |
| LEVEL 1 | INPUTTING OF USER NAME AND PASSWORD | 1~2 |

AUTHENTICATION INFORMATION PROCESSING METHOD

BACKGROUND OF THE INVENTION

The invention relates to an authentication information processing technology.

Generally, there are a variety of information processing systems (that include utilizing Web pages, various categories of applications, etc.) operated by establishing connections to a server via a network from various types of information processing devices (which will hereinafter be called user terminals) such as computers, etc. Normally, this type of system requires inputting authentication information such as a password, an ID number, etc. in order to prevent a wrong use by others.

In the system, pieces of individual information such as a user name, a password, etc. are managed in block on a server side. Then, a user side performs a log-in (connection) operation to the server as the necessity may arise. The server accepting the log-in operation executes an authentication process about the log-in operation by the user. When the server authenticates the log-in operation by the user, the user is allowed to utilize the system.

Normally, the authentication process is that all the terminals connectable to the server can log in simply by inputting the authentication information such as the user name or the password, etc. Therefore, in the system, it was not sufficient to ensure the security such as preventing a wrong entry into the server, and so forth. Accordingly, the conventional system has a possibility of causing a leakage of various pieces of information such as user information and so on.

For example, the following methods can be exemplified as methods of maintaining the security of the system accepting the log-in from the multiplicity of user terminals.

First, a log-in procedure for having other pieces of authentication information inputted, excluding the user name or the password, is also considered.

For instance, there is the log-in procedure in which the password is inputted. Further, there are other log-in procedures, wherein a keyword (example: user's individual information is preset as a keyword, and this keyword is inquired about) is displayed at random, and characters to be inputted each time are changed. Of these other procedures, there is a procedure involving a finger print authentication and the use of an ID card (such as a smart card, etc.) from which an individual can be identified. Moreover, one of the log-in procedures is that the log-in is permitted from a timing of the log-in operation.

Other than the security level maintaining technology by adding the log-in procedure as described above, for example, the following technologies are considered.

To begin with, as the technology described above, a technology of adequately automatically changing the password when logging in, is disclosed (Japan publication of patent application No. 7-160638 and Japan publication of patent application No. 7-18206).

Moreover, as the technology described above, there is disclosed a technology related to simple authentication in which a log-in operation from the already-authenticated user is to be authenticated from next time onwards by way of the simple authentication (Japan publication of patent application No. 2000-36809).

Disclosed further as the technology described above is a technology related to log-in control, wherein a specified user determined by a security level among a plurality of users utilizing the same user ID, can log in (Japan publication of patent application No. 4-277855).

Disclosed moreover as the technology described above is a technology related to a log-in system for judging whether a command can be executed or not by judging a security level of a communication path when logging in (Japan publication of patent application No. 6-337844).

Further, as the technology described above, there is disclosed a technology related to user authentication based on a user ID and a password designated by the user and a key character string preset by an authentication system (Japan publication of patent application No. 2001-273259).

SUMMARY OF THE INVENTION

In the variety of log-in procedures described above, however, the unspecified terminal can log in by executing the predetermined log-in procedure. Hence, in the case where the log-in procedure is made known there might be a possibility in which an unknown party makes unfair use of the system.

Further, even if the password or the key character string is to be changed automatically, the information for specifying the formal user is the user ID. Hence there might be a possibility in which the unknown party having acquired the user ID unfair uses it.

Moreover, the provision of the multiplicity of log-in procedures for keeping the security might cause a decline of utility to the formal user on the occasion of continuously utilizing the system.

The invention was made in view of the items given above. Namely, the invention aims at providing an authentication information processing technology capable of maintaining the security for the user authentication such as the log-in and the utility to the formal user.

For solving the problems given above, the invention adopts the following means.

Namely, in the invention, terminal information of a user terminal requesting a log-in is acquired. Then, in the invention, a log-in procedure to be applied to the user terminal is determined based on the terminal information. Further, in the invention, a log-in operation from the user terminal is accepted. Then, in the invention, whether the log-in from the user terminal is right or not is judged based on the determined log-in procedure and the accepted log-in operation.

In the invention, the user requesting the log-in is identified, and the log-in procedure corresponding to the user terminal is determined.

Hence, according to the invention, the log-in request from an unspecified terminal is prevented, whereby the system security against the wrong entry, etc. can be maintained.

Further, in the invention, the accumulated log-in count from the user terminal may be stored relate to the terminal information. At this time, in the invention, the log-in procedure is determined in accordance with the accumulated log-in count.

Hence, according to the invention, the log-in procedure for the user terminal is determined corresponding to the right log-in count from the specified user terminal, thereby making it possible to relieve the log-in operation of the user who continues the right log-in operation.

Moreover, in the invention, the last log-in time from the user terminal may be stored relate to the terminal information. At this time, in the invention, the log-in procedure is determined corresponding to a period elapsed since the last log-in time.

Therefore, according to the invention, the log-in procedure for the user terminal is changed corresponding to the period elapsed since the last log-in time, whereby the system security can be maintained.

Furthermore, the invention may be a program for actualizing any one of the functions described above. Moreover, in the invention, this type of program may be recorded on a readable-by-computer storage medium.

Still further, the invention may be a device for actualizing any one of the functions described above.

DETAILED DESCRIPTION OF THE INVENTION

One embodiment of an authentication information processing method of the invention will hereinafter be described with reference to the drawings. The embodiment involves using an authentication information processing program for actualizing the authentication information processing method of the invention. Then, in the embodiment, this authentication information processing program is introduced (installed) into an information processing device such as a server, etc. for managing the system, thereby becoming the authentication information processing device. A user terminal on the side of a user who utilizes the system logs in (connects to) the authentication information processing device. The authentication information processing device, when making a formal log-in procedure, judges that the user is allowed to utilize the system.

Note that an accessible connection of the user terminal to the system of the authentication information processing device is called log-on, these (log-in and log-on) are equivalent in terminology in the invention.

<System Architecture>

Figure 1:
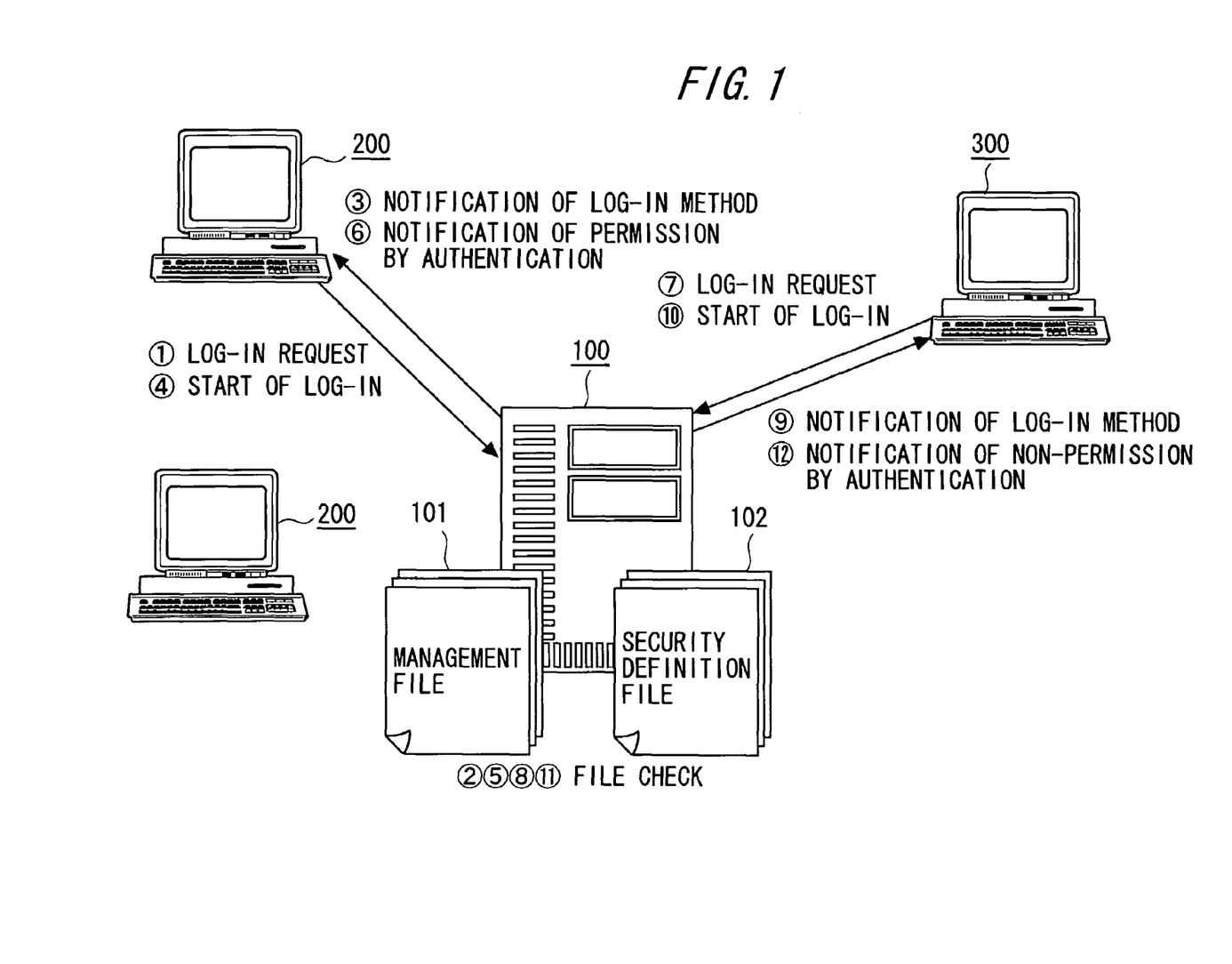
FIG. 1 is a view of an outline of architecture of a system for embodying the authentication information processing method of the invention.

FIG. 1 is a view of an outline of architecture of a system for embodying the authentication information processing method of the invention. The system is configured by an authentication information processing device 100 on the side of managing the system, and formal user terminals 200 connected to the authentication information processing device 100 via a variety of computer networks such as the Internet or LAN (Local Area Network) and so on. Further, a wrong user terminal 300 trying to unfair use the system is connected to the system via the variety of computer networks.

The authentication information processing device 100 has a management file 101 for retaining information about every individual user terminal that logs in the system. Further, the authentication information processing device 100 has a security definition file 102 for retaining a log-in procedure and information about a system security level (a security against a wrong use) in a way that makes them relate to each other.

In the embodiment, the authentication information processing device 100 acquires the terminal information about the user terminal 200. The authentication information processing device 100 determines the log-in procedure of the user terminal 200 on the basis of the terminal information. Then, the authentication information processing device 100 accepts a log-in operation based on the determined log-in procedure. When the accepted log-in procedure is right, the authentication information processing device 100 permits the log-in of this user terminal 200.

<File Structure>

Next, structures of the files that are referred to when executing the authentication information process by the device 100, will be explained. As these files, there exist the management file 101 for retaining the information about every users and the security definition file 102 which makes the log-in procedure and the security level relate to each other.

<Management File>

Figure 2:
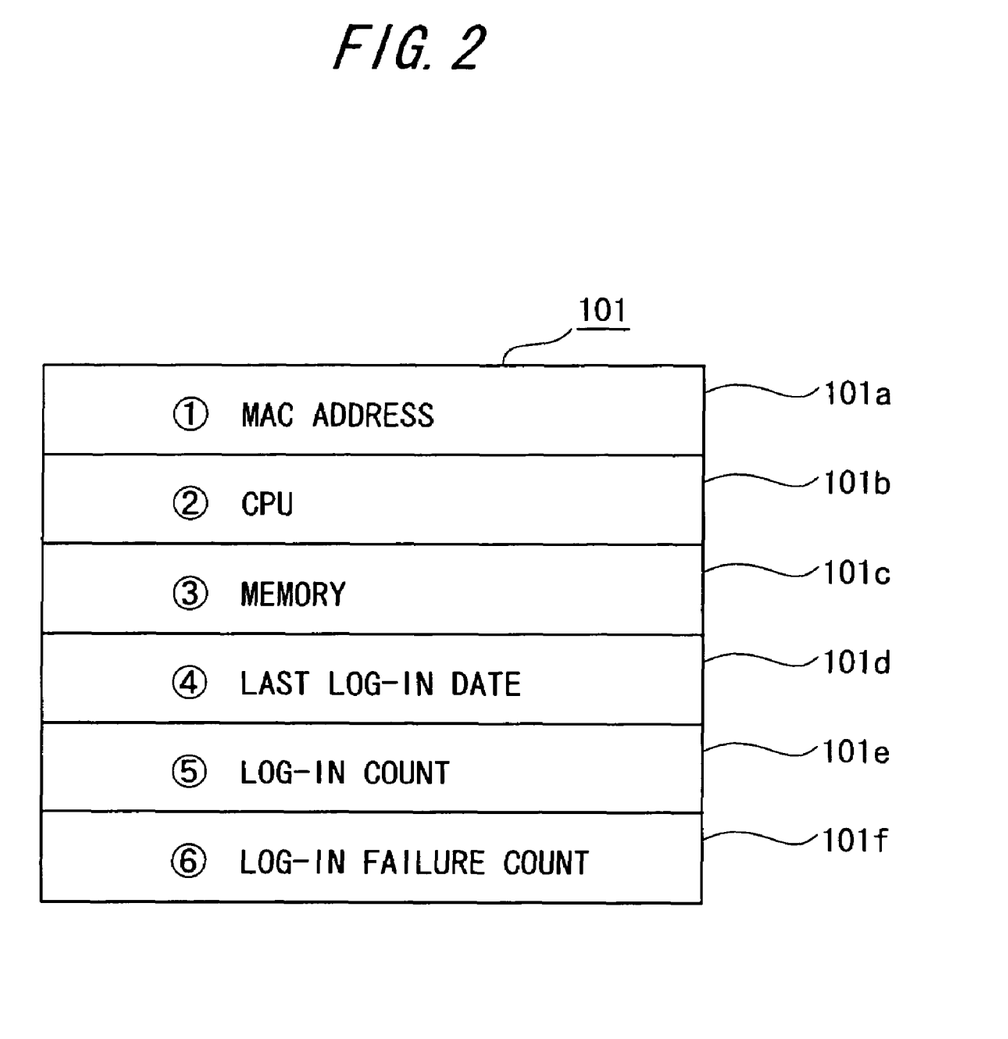
FIG. 2 shows one example of the file structure of the management file retained on the device.

FIG. 2 is one example of the file structure of the management file 101 retained on the device 100. The management file 101 is a file that the device 100 refers to when acquiring the terminal information together with a log-in request from the user terminal 200 and collating it. The files, of which the number corresponds to the individual user terminals 200 logging in the system, exist on the device 100.

As shown in FIG. 2, the management file 101 is stored with pieces of terminal information about every individual user terminal 200 such as a MAC (Media Access Control) address 101a, CPU (central processing unit) model number information 101, memory model number information 101c, a last log-in date (information of the last log-in time according to the invention) 101d, an accumulated system log-in count 101e and a system log-in failure count 101f.

The MAC address 101a of the user terminal 200 is used for the device 100 to specify the user terminal 200. This MAC address 101a is a unique piece of identifying information assigned to a network card incorporated into an appliance connected to the network.

Further, the CPU information 101b of the CPU mounted on the user terminal 200 is used for the device 100 to specify the user terminal 200. This piece of CPU information 101b is exemplified such as a CPU model number or a CPU clock frequency, etc.

The memory information 101c of the memory mounted on the user terminal 200 is exemplified such as a memory model number or a numerical value of an entire capacity of the memory, and so forth.

Further retained is the last log-in date (the information of the last log-in time according to the invention) 101d from the user terminal 200. The device 100 determines the log-in procedure of the user terminal 200 on the basis of the last log-in date 101d.

Then, the accumulated system log-in count 101e of the user terminal 200 is retained. The device 100 determines the log-in procedure of the user terminal 200 on the basis of this accumulated log-in count 101e.

Moreover, the log-in failure count 101f in the system is retained in the management file 101. The device 100 determines based on this log-in failure count 101f whether a level of the log-in procedure of the user terminal 200 is raised or not.

The device 100, in the case of accepting a log-in request from the user terminal 200, acquires the terminal information of the user terminal 200. The device 100 judges whether this machine is a user terminal 200 which is permitted to the system, by referring to the terminal information, the MAC address 101a, the CPU information 101b and the memory information 101c in the management file 101.

When the user terminal 200 is the permitted to log-in, the device 100 executes the following processes.

The device 100 searches the security definition file 102 for the log-in procedure of the user terminal 200 by referring to the information such as the last log-in date 101d or the accumulated log-in count 101e, thus determining it. Note that a detailed explanation of the security definition file 102 will be made later on.

Moreover, the device 100 adds the log-in failure count 101f each time the user terminal 200 falls into a log-in failure. The device 100, when this log-in failure count 101f reaches a fixed count, strengthens the security level by changing the log-in procedure of the user terminal 200.

<Security Definition File>

Figure 3:
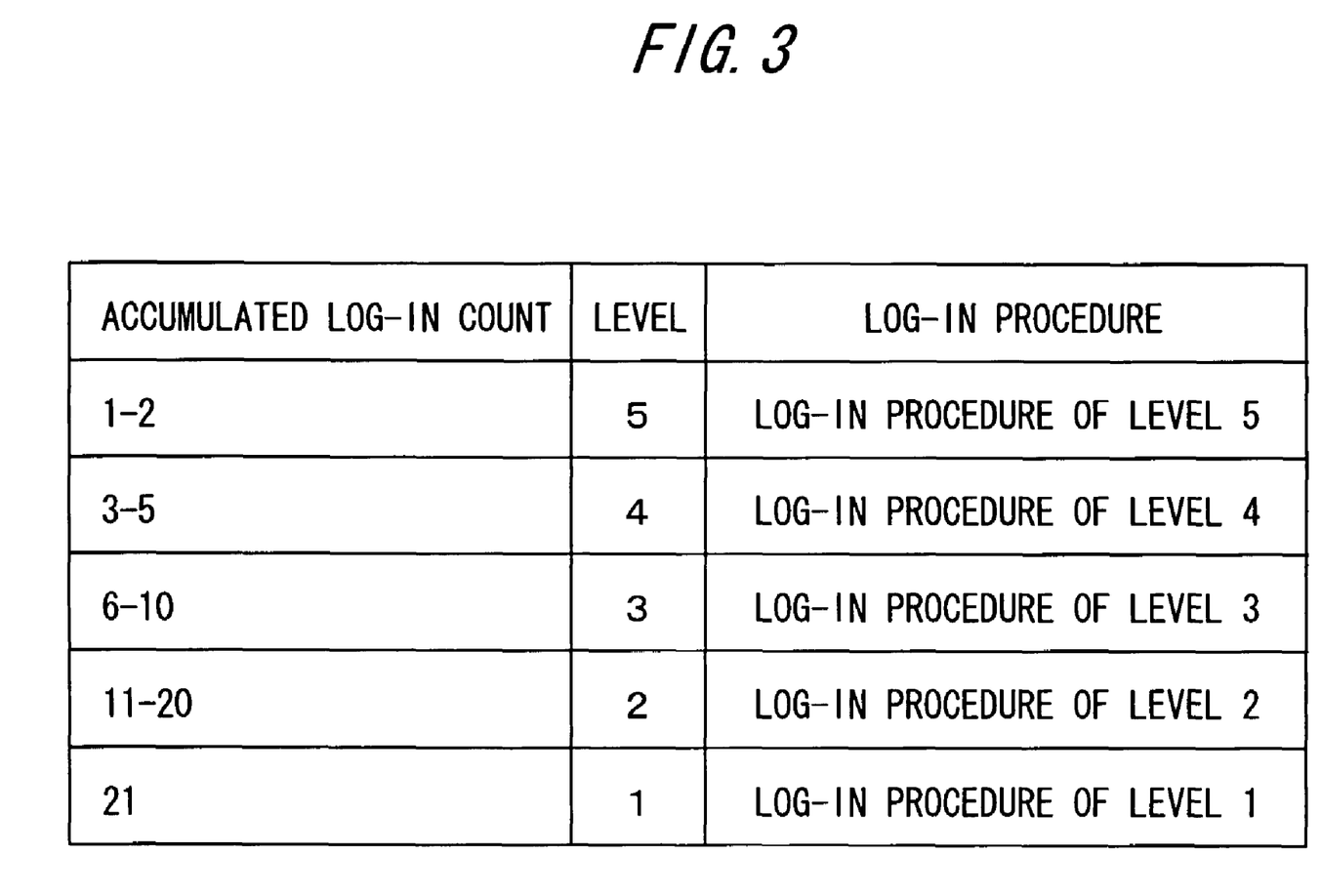
FIG. 3 shows the security definition file.
Figure 4:
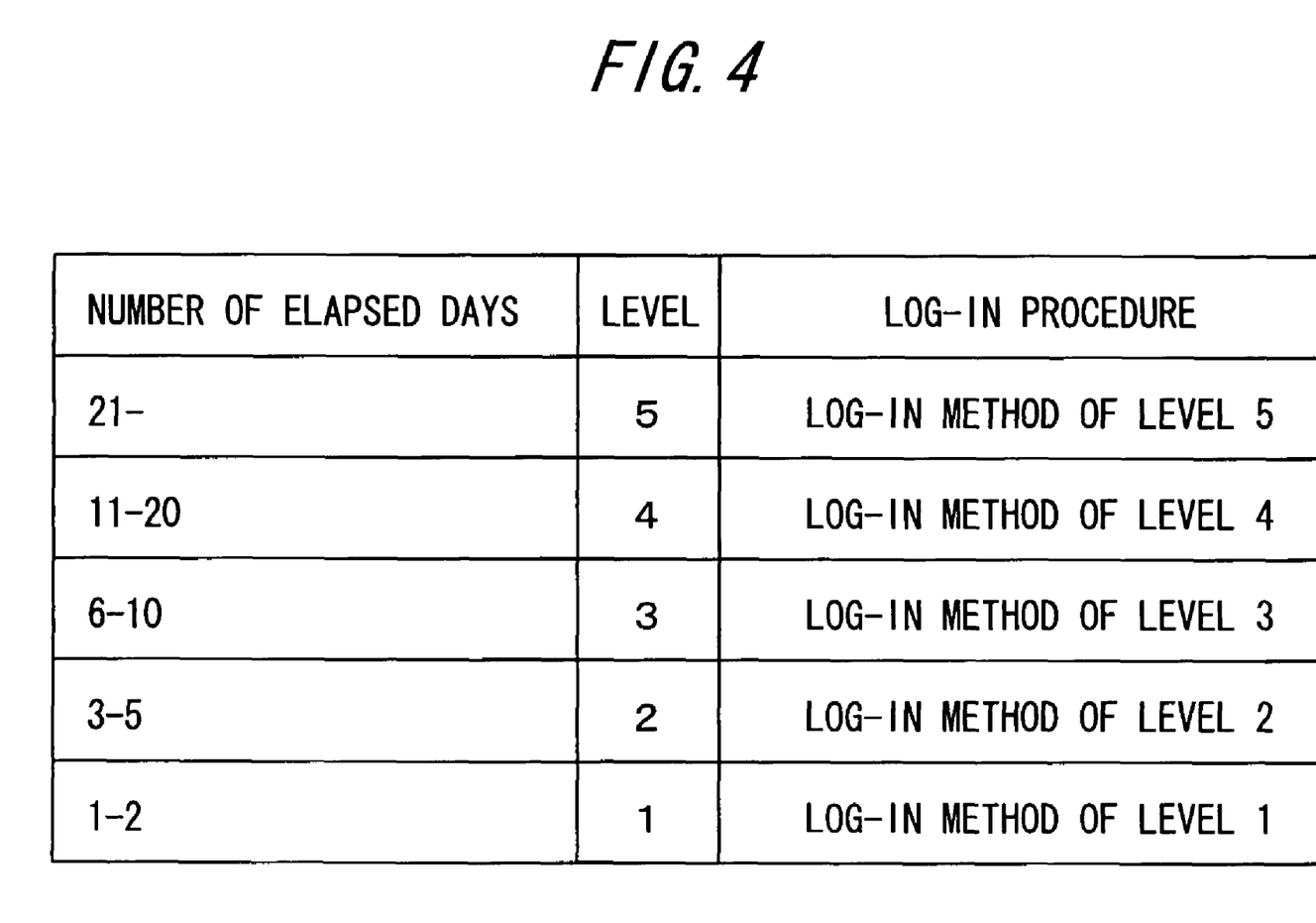
FIG. 4 shows the security definition file.
Figure 5:
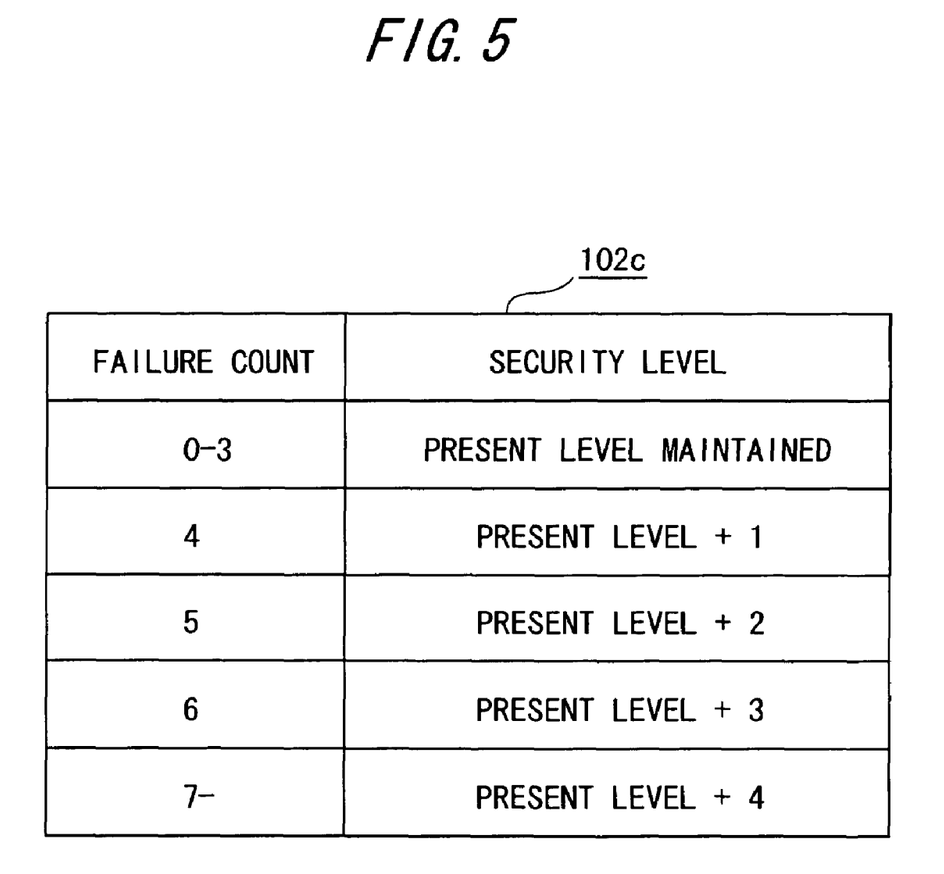
FIG. 5 shows the security definition file is retained with information about a change rate of the security level relate to the log-in failure count.
Figure 6:
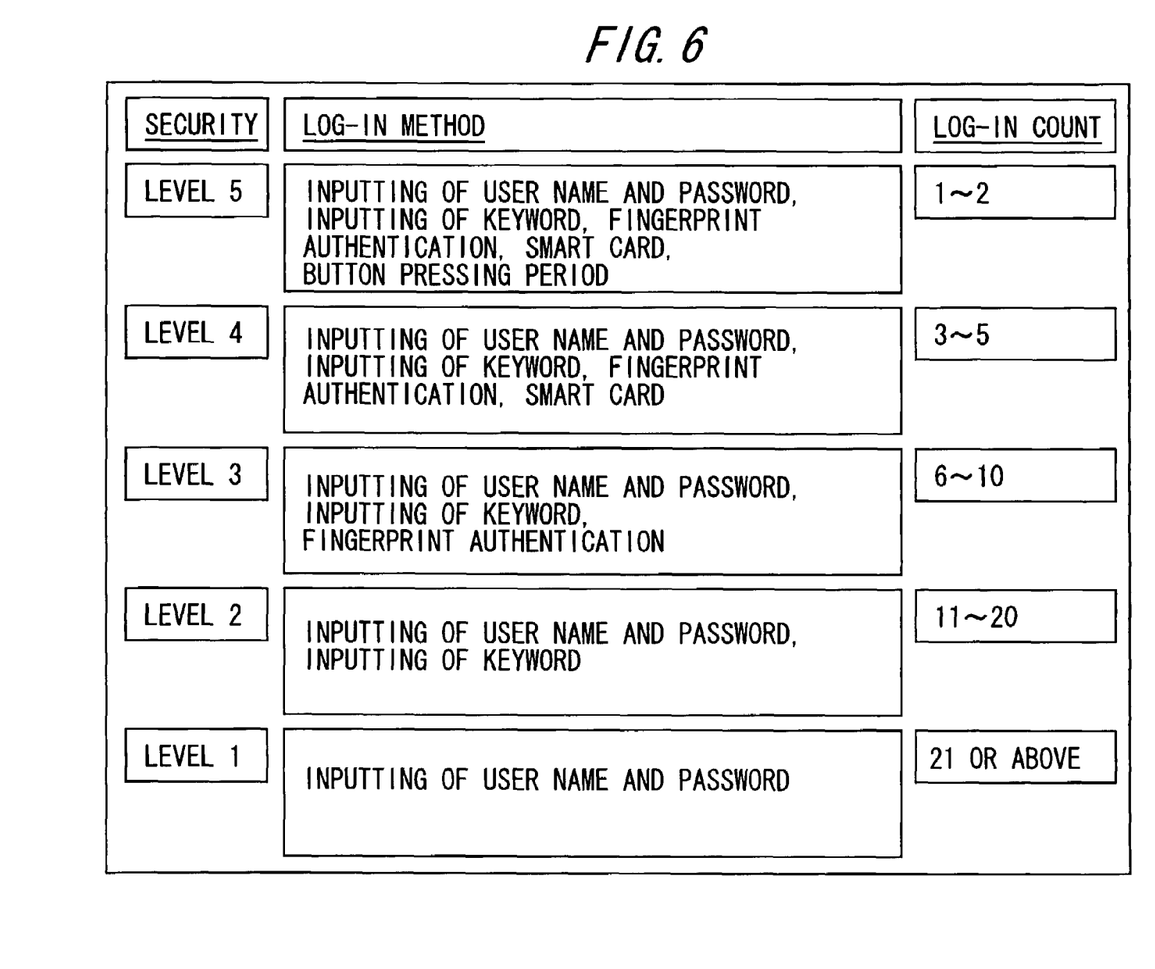
FIG. 6 shows one example of a log-in procedure data table 102c for retaining the security level set relates to the log-in procedure.

FIGS. 3, 4 and 5 show one example of the file structure of the security definition file 102 retained on the device 100. Further, FIG. 6 is one example of a log-in procedure data table 102d for retaining the security level set relates to the log-in procedure.

The security definition file 102 is a file in which to define a security level for the device 100 to determine the log-in procedure of the user terminal 200 from the accumulated log-in count through the last log-in date. A larger value of the security level indicates a higher security.

In the security definition file 102a shown in FIG. 3, the accumulated log-in count and the security level are retained relate to each other. In the security definition file 102a, for instance, if the accumulated log-in count ranges from 3 times to 5 times, it defines a security level 4, and, if the accumulated log-in count ranges from 11 times to 20 times, it defines a security level 2. Namely, the device 100, initially when the accumulated log-in count is small, sets high the security level of the user terminal 200. Thereafter, the device 100, when the accumulated log-in count of the user terminal 200 increases, decreases the security level relate thereto. Note that the relationship between this accumulated log-in count and the security level can be properly set without being limited as in the embodiment in the invention.

Moreover, in the security definition file 102b shown in FIG. 4, the last log-in date and the security level are retained relate to each other. In the security definition file 102b, for example, if the number of days elapsed since the last log-in date is 6 through 10 days, it defines the security level 3, and, if the number of days elapsed since the last log-in date is 21 days or longer, it defines the security level 5. Namely, the device 100 raises the security level relate thereto when the number of days elapsed since the last log-in date of the user terminal 200 is large. Further, the device 100 lowers the security level relate thereto when the number of days elapsed since the last log-in date of the user terminal 200 is small. Note that the relationship between this last log-in date and the security level can be properly set without being limited as in the embodiment in the invention.

In the embodiment, the device 100 determines the security level relates to the accumulated log-in count of the user terminal 200 from the security definition file 102a. Moreover, the device 100 determines the number of days elapsed since the last log-in date from the security definition file 102b. Then, the device 100 selects the higher security level in the security level based on the accumulated log-in count and the security level based on the number of days elapsed since the last log-in date, and employs it for the log-in procedure. Note that the method of determining the log-in procedure can be properly set without being restricted to the example given above in the invention.

A security definition file 102c shown in FIG. 5 is retained with information about a variation of the security level relate to the log-in failure count. In the security definition files 102c, for example, if the log-in failure count is up to 3 times, the device 100 keeps the security level as the present level. Further, if the log-in failure count is 5 times, the device 100 raises the security level higher by 2 levels than the present level.

Namely, in the security definition file 102c, a rising value of the security level is defined corresponding to a fixed failure count. Note that the relationship between this log-in failure count and the security level can be properly set without being limited as in the embodiment in the invention.

A log-in procedure data table 102d shown in FIG. 6 is a table for defining the log-in procedure for which the device 100 requests the user terminal 200. This log-in procedure data table 102d is retained with information about specific log-in procedures relate to the security levels.

In the embodiment, for example, the log-in procedure to the level 5 involves an authentication by inputting a user name and a password, an authentication by inputting a keyword, an authentication by a fingerprint, an authentication by a smart card and an authentication by a time for which a predetermined button is kept pressing. Furthermore, the log-in procedure to the level 3 involves the authentication by inputting the user name and the password, the authentication by inputting the keyword and the authentication by the fingerprint. Moreover, the log-in procedure to the level 1 involves only the authentication by inputting the user name and the password.

Namely, in the log-in procedure data table 102d, the log-in procedure is relieved corresponding to the security level.

It is noted that, the authentication by the time for which the predetermined button is kept pressing is carried out by the following method. To start with, on the side of the device 100, a time for which a predetermined button on the keyboard provided on the user terminal 200 is kept pressing, is preset. Then, the device 100 acquires the time for which the button is kept pressing when in the log-in operation, and collates the acquired time with the preset time. The device 100, if both are coincident with each other as a result of the collation, authenticates this user terminal 200.

The device 100 determines the log-in procedure of the user terminal 200 by setting the log-in procedure data table 102d to the higher security level of either the security definition files 102a or 102b.

<Operational Example in Log-in Procedure>

FIGS. 7 through 11 are diagrams of one example of a screen transition when logging in. FIGS. 7 through 11 shows the screen transition in a case where the device 100 accepts the log-in operation from the user terminal 200 given the security level 5.

Figure 7:
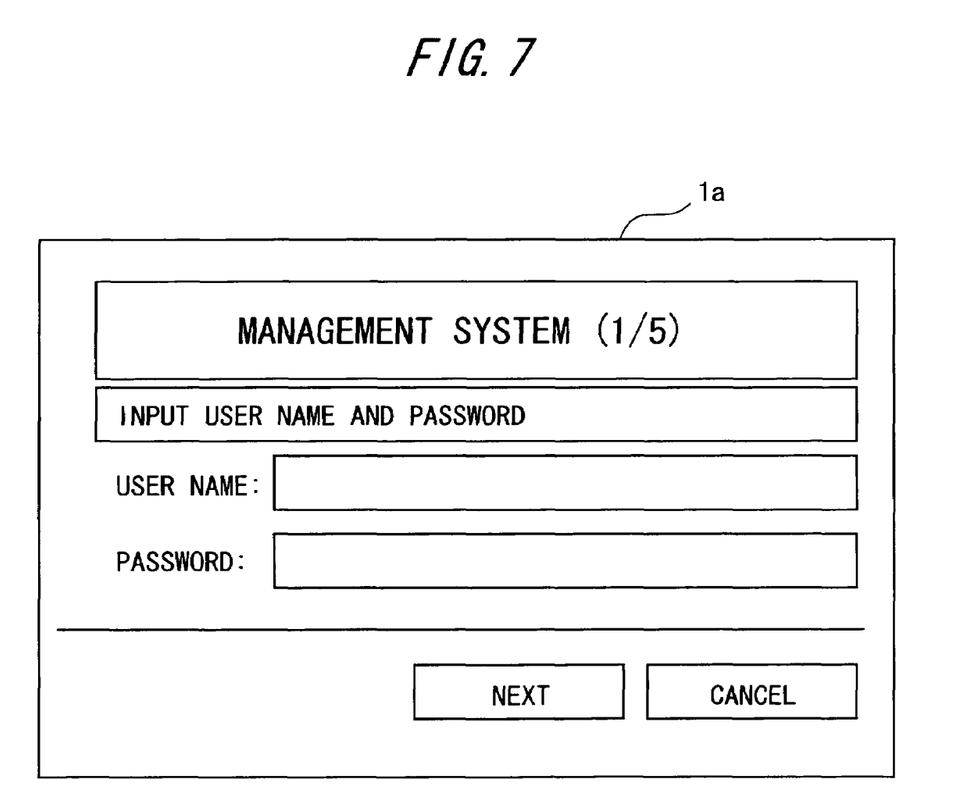
FIG. 7 shows the user utilizing the system inputs the user name and the password to a log-in procedure operation screen.

To begin with, the user utilizing the system inputs the user name and the password to a log-in procedure operation screen 1a in FIG. 7 that is displayed on the unillustrated display of the user terminal 200.

Figure 8:
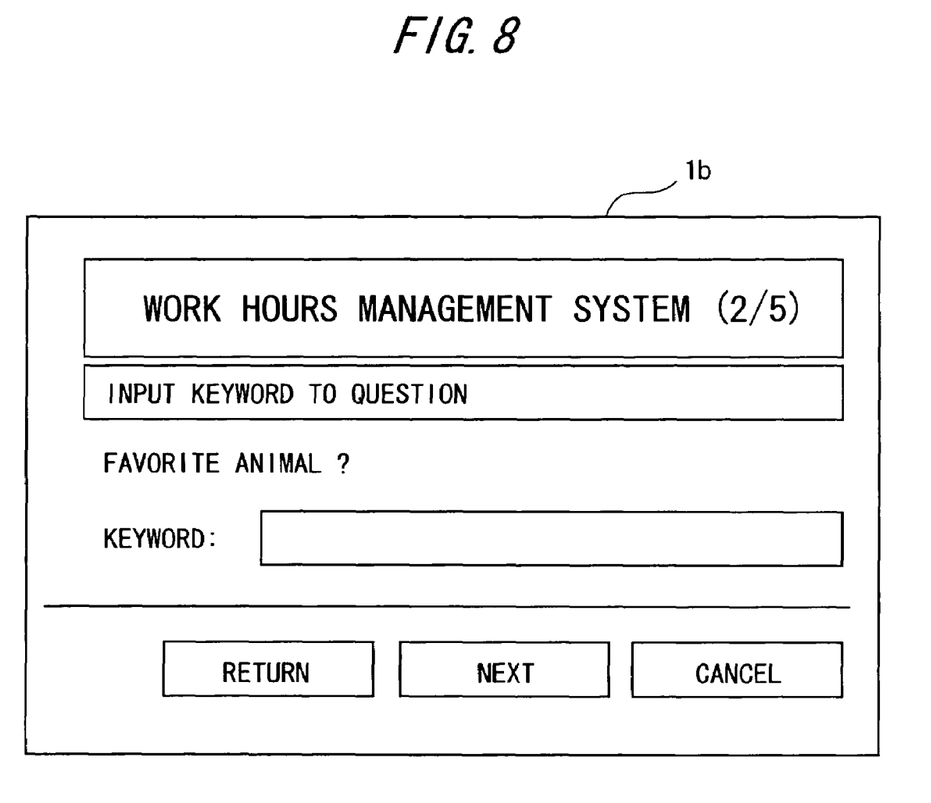
FIG. 8 shows the device instructs the user terminal to display a log-in procedure operation screen after a completion of authenticating the user name and the password.

After a completion of authenticating the user name and the password, the device 100 instructs the user terminal 200 to display a log-in procedure operation screen 1b in FIG. 8. On this log-in procedure operation screen 1b, the device 100 queries about information that can be known by only the user. Therefore, this piece of information and a question for querying about the information, are set beforehand. Note that, this piece of information is referred to as a keyword in the embodiment.

Displayed on the log-in procedure operation screen 1b is a question about [a favorite animal] among a plurality of question items of which a server administrator has been notified beforehand. The user inputs the keyword to the question from the user terminal 200. The device 100 acquires the keyword inputted from the user terminal 200. Then, an authentication process is executed by comparing the preset keyword with the inputted keyword.

Figure 9:
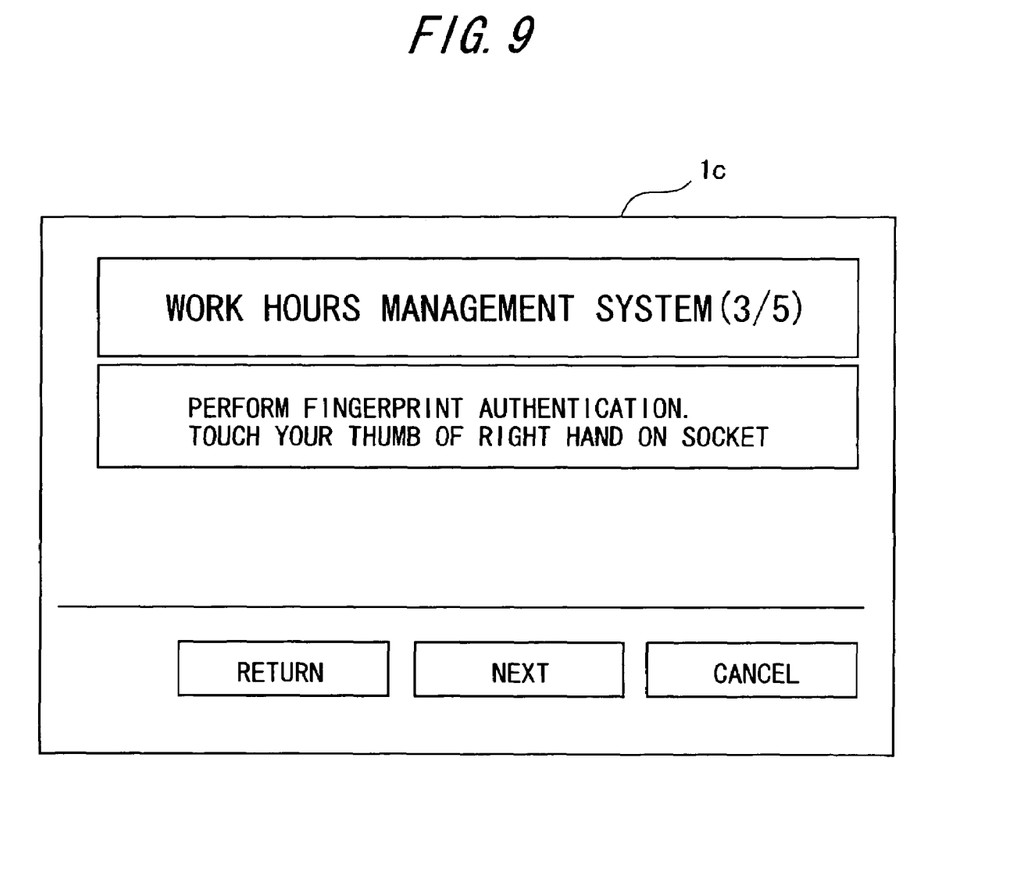
FIG. 9 shows the device instructs the user terminal to display a log-in procedure operation screen after a completion of authenticating the keyword.

After a completion of authenticating the keyword, the device 100 instructs the user terminal 200 to display a log-in procedure operation screen 1c in FIG. 9. On this log-in procedure operation screen 1c, an unillustrated fingerprint authentication system provided in the user terminal 200 is made to recognize the user's fingerprint. Therefore, the user terminal 200 is provided with an unillustrated fingerprint authentication device. This fingerprint authentication device is exemplified such as an image reader like s scanner, etc. The device 100 acquires information on this fingerprint from the user terminal 200 and executes the authentication process.

The user terminal 200 transmits the fingerprint data read from the fingerprint authentication device to the device 100.

Figure 10:
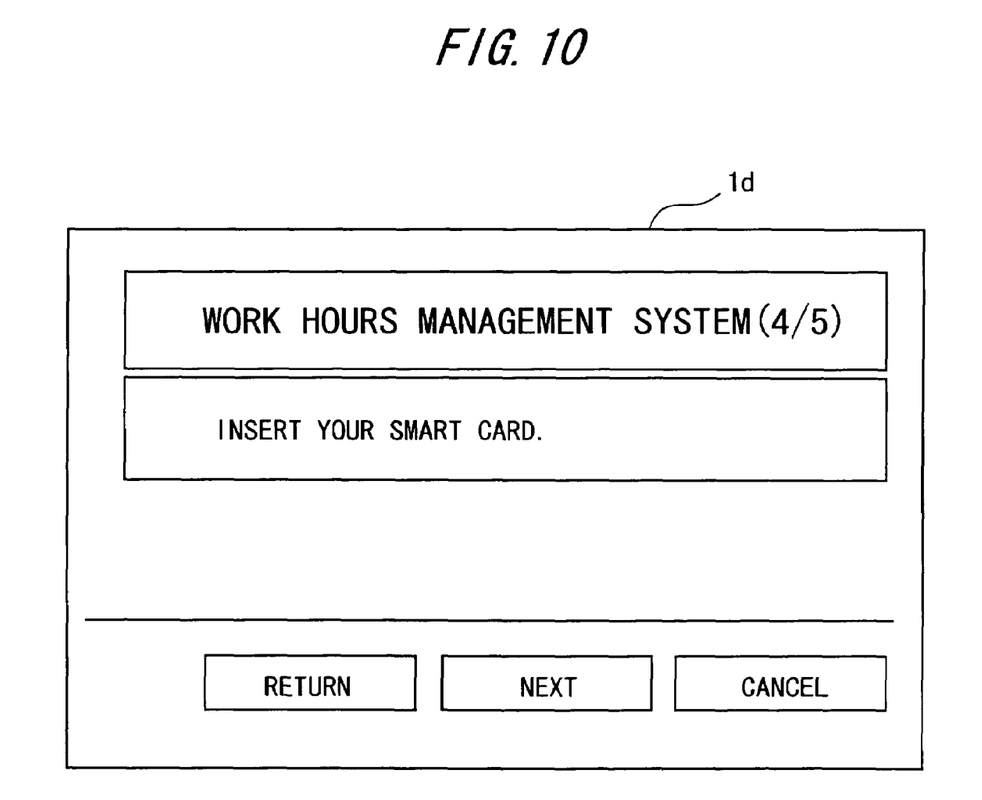
FIG. 10 shows the device instructs the user terminal to display a log-in procedure operation screen after a completion of the fingerprint authentication.

After a completion of the fingerprint authentication, the device 100 instructs the user terminal 200 to display a log-in procedure operation screen 1d in FIG. 10. On the log-in procedure operation screen 1d, the user terminal 200 is made to read an unillustrated smart card transferred to the user. A PIN (Personal Identification Number) is collated between the smart card and the user terminal 200.

Note that the smart card connotes a plastic card into which a CPU, a memory or an IC chip like a security circuit are incorporated. It is noted that, the smart card might be called an IC card. A structure and a function of this smart card are already known, and hence their detailed explanations are omitted.

On the device 100, in the case of being used for the process of collating the smart card, the PIN collation process is conducted in the smart card. The smart card is stored with a correct PIN that has been set. When in the Pin collation process, the user terminal 200 supplies the inputted PIN to the smart card. The smart card collates the inputted Pin with the preset PIN. Upon a completion of the PIN collation, the user terminal 200 reads user authentication information from the smart card. Then, the user terminal 200 transmits the authentication information of the smart card to the device 100.

Figure 11:
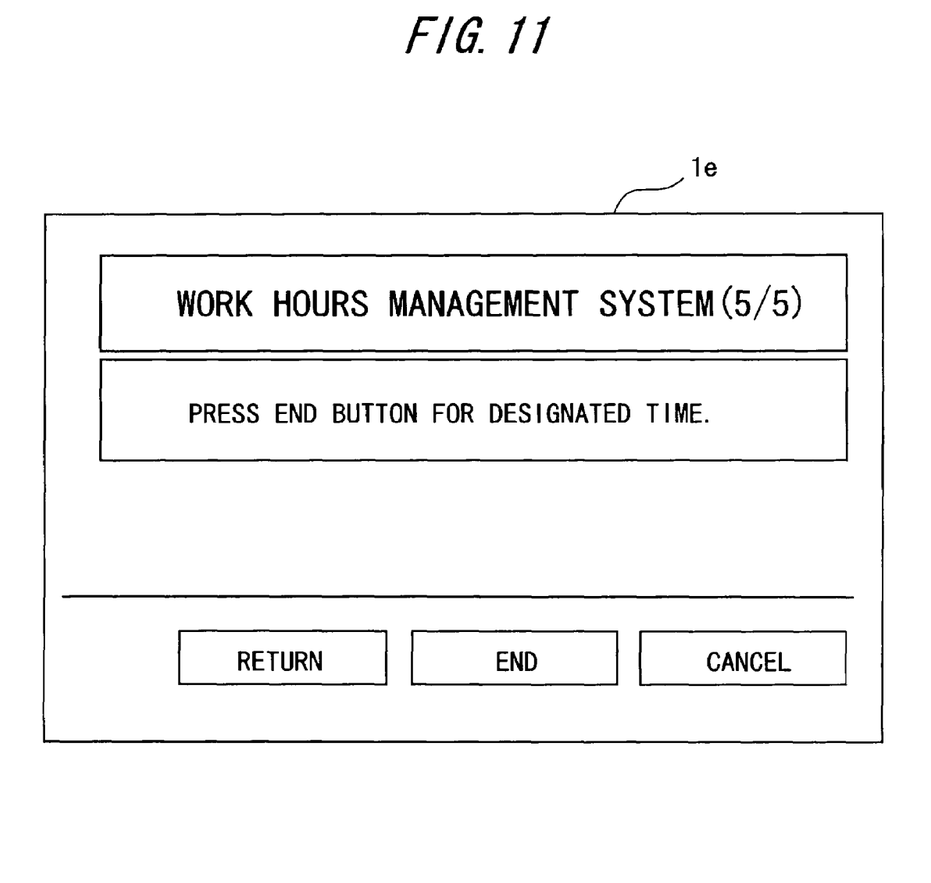
FIG. 11 shows the device instructs the user terminal to display a log-in procedure operation screen after a completion of the authentication process by the smart card.

After a completion of the authentication process by the smart card, the device 100 instructs the user terminal 200 to display a log-in procedure operation screen 1e in FIG. 11. On log-in procedure operation screen 1e, the authentication using the button pressing time is executed. The user executes pressing the button for a predetermined time (e.g., 3 sec.) as a preset button pressing time. The device 100 confirms that this button pressing time is the predetermined time, and executes the authentication process.

After a completion of all the authentication processes described above, the user terminal 200 is allowed to connect to the system.

Note that this log-in operation is stored as an accumulated log-in count relate to the terminal information in the embodiment. If the formal log-in procedure operation to be applied to this user terminal 200 is completed of the operation is repeated, the device 100 lowers the security level of the user terminal 200, thereby simplifying the log-in procedure.

For example, when the security level is initially 5, the security level of the user terminal 200 becomes the level 4 by completing the right log-in operation a fixed number of times. At this time, the log-in procedure operation screen 1e ceases displaying on the display of the user terminal 200. With a further repeating to use, the security level of the user terminal 200 becomes the level 3. Then, the log-in procedure operation screen 1d is omitted, the authentication process is further simplified.

Hence, according to the device 100, the utility for the formal user can be maintained while keeping the security level.

<Log-in Process>

Figure 12:
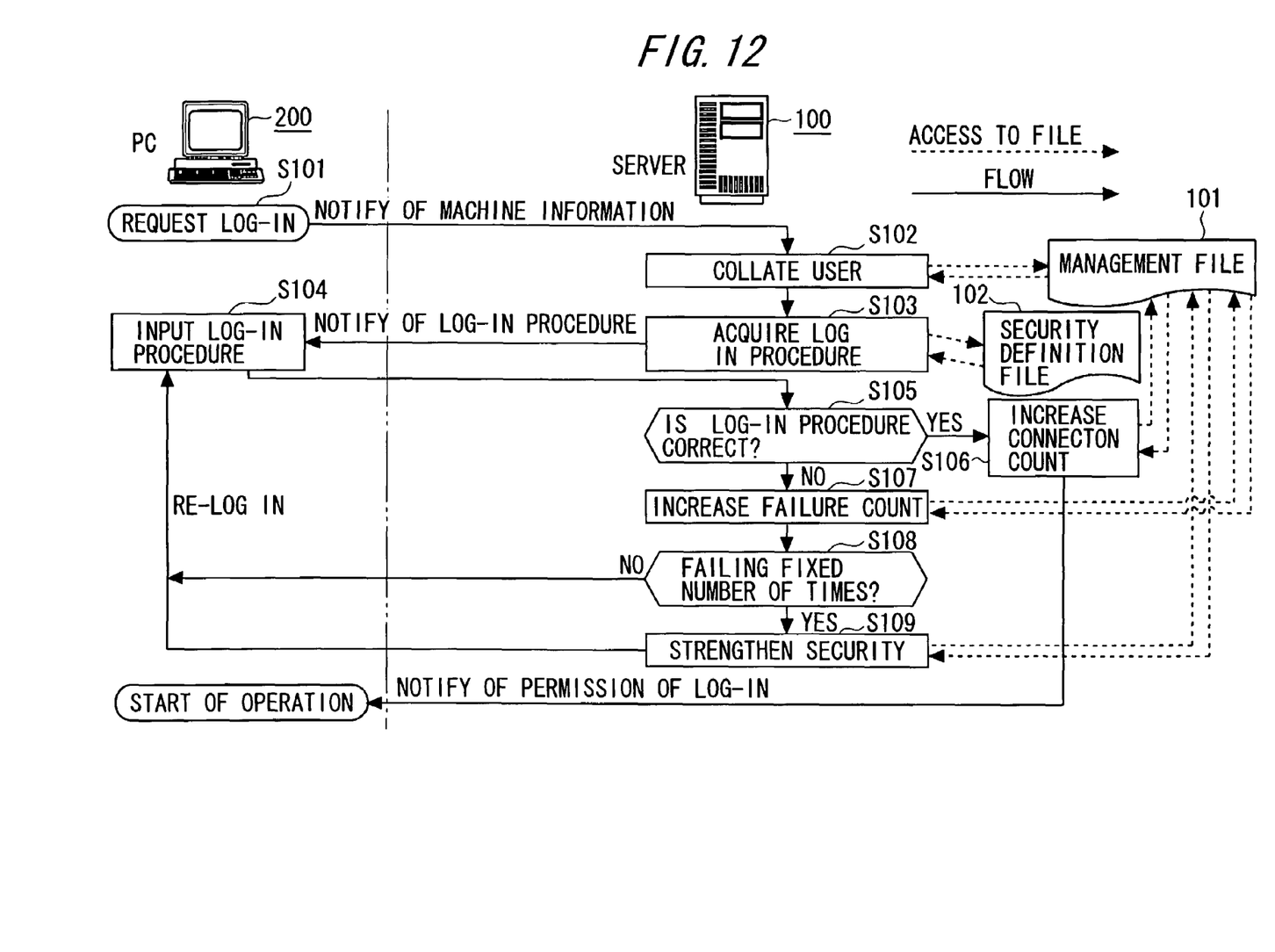
FIG. 12 is a flowchart for explaining a log-in process by the device.

FIG. 12 is a flowchart for explaining a log-in process by the device 100. An authentication information process (a log-in process) in the embodiment will be explained based on FIG. 12.

At first, the device 100 accepting a log-in request (S101) from the user terminal 200, acquires the terminal information from the user terminal 200. At this time, the device 100 searches the management file 101 on the basis of the terminal information. Then, the device 100 refers to the last log-in date and the accumulated log-in count of the user terminal 200. At this time, the device 100 refers to the higher (a larger number of log-in procedures) of both of the security levels.

Moreover, the device 100 obtains from the management file a piece of information about the log-in failure count concerning the user terminal 200. Namely, the process of collating the terminal information with the management file 101 by the device 100, is named a user collation process (S102).

The device 100 refers to the security definition file 102 related to the management file 101, and determines the present security level about the user terminal 200. Then, the device 100 determines the log-in procedure relate to the determined security level on the basis of the security definition file 102 (S103). The device 100 notifies of the log-in procedure determined for the user terminal 200. Then, the device 100 requests a log-in operation based on this log-in procedure through the log-in operation screen.

The user inputs, to the user terminal 200, the operation of the log-in procedure determined by the device 100 (S104). The device 100 accepts via the network the log-in operation inputted to the user terminal 200.

The device 100 judges, by referring to the security definition file 102, whether the accepted log-in operation is a right log-in operation or not (S105). The device 100, when the log-in operation proves the right log-in operation as a result of the judgment in step 105, increments the accumulated log-in count by 1 (S106). Then, the device 100 permits the log-in of the user terminal 200 and terminates the authentication process.

In the case of judging in step 105 that the accepted log-in operation is not right log-in operation, the device 100 increments the log-in failure count, in the management file 101, by 1 (S107).

Then, the device 100 judges whether the log-in failure count of the user terminal 200 reaches a fixed preset count or not (S108). At this time, when the log-in failure count does not reach the fixed preset count, the device 100 returns to step 104 in order to request the user terminal 200 for the log-in operation once again.

In the process in step 108, when the log-in failure count reaches the fixed preset count, the device 100 refers to the security definition file 102 to raise the security level (S109). Then, the device 100 refers to the security definition file 102 and raises the security level (S109). Then, the device 100 returns to the process in step 104 for requesting the user terminal 200 for the log-in operation once again.

The device 100 can maintain the utility to the user while keeping the security level by executing this kind of log-in process.

<Effects of the Embodiment>

In the embodiment, the authentication method performed when logging in is judged from the results in the past, and the security level is changed. Accordingly, in the embodiment, the security is strengthened as compared with the conventional system using only the user name and the password. Moreover, the system simplifies the log-in procedure of the user terminal 200 by continuing the right log-in operation and therefore has no necessity of performing the troublesome input at all times. Hence, according to the device 100, the wrong log-in can be prevented without any decline of usability to the user.

<Modified Example>

Note that the authentication information processing method of the invention is not limited to only the embodiment, and a variety of changes can be, as a matter of course, added within the range that does not deviate from the gist of the invention.

For example, in the event of being once logged in unfair, a so-called hacker can trespass on the system any number of times, and there might be a case where the information within the system can be monitored over a long period of time. For solving this problem, the process of the device 100 may be shifted from the simple security level to the strengthened security level.

Figure 13:
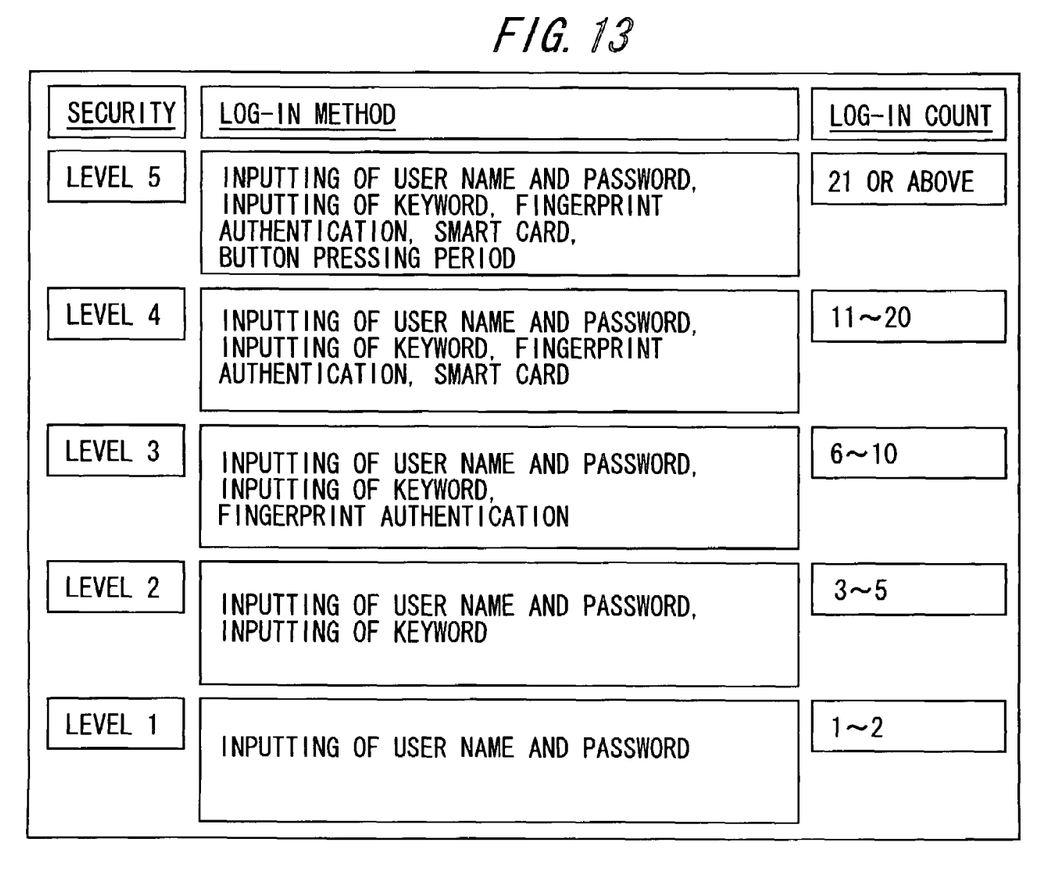
FIG. 13 shows one example of a log-in procedure data table in which the security level and the log-in procedure are raised corresponding to an increase in the log-in count.

FIG. 13 is one example of a log-in procedure data table in which the security level and the log-in procedure are raised corresponding to an increase in the log-in count. In this process, the security level is raised higher as the connection count becomes larger.

Generally, the wrong user such as the hacker, etc., once succeeding in the log-in, tries again the log-in operation by use of the same log-in procedure. The device 100, in the case of being once logged in, adds the log-in procedure corresponding to the log-in count. Hence, in the event of the hacker logging in any number of times, the security level is automatically raised, whereby the re-trespass can be prevented.

Further, as for the determination of the security level, the security level relate to the accumulated log-in count of the user terminal 200 and the security level relate to the number of days elapsed since the last log-in date are referred to, and the higher of the security levels is determined as the security level of the user terminal 200. The invention is not, however, restricted to this.

For instance, the lower of the security level searched out based on the accumulated log-in count and the security level searched out based on the number of days elapsed since the last log-in date, may be determined as the security level of the user terminal 200.

Moreover, for example, an average value of the security level searched out based on the accumulated log-in count and the security level searched out based on the number of days elapsed since the last log-in date, may be determined as the security level of the user terminal 200.

Further, for instance, any one of the security level searched out based on the accumulated log-in count and the security level searched out based on the number of days elapsed since the last log-in date, may be determined as the security level of the user terminal 200.

Still further, when the log-in operation in the determined log-in procedure is right without changing the security level, the log-in to be applied to the user terminal 200 may be permitted.

Yet further, the device 100 may effect an access restriction of the user terminal 200 corresponding to the security level.

Moreover, a range of the file that can be accessed when logging in may be determined, or, a write restriction of the file to be linked may also be effected.

Furthermore, the log-in procedure may be determined based on the accumulated log-in count or the number of days since the last log-in date without searching out the security level.

Further, the authentication information, if being the information from which the terminal can be identified, may be in any category or may have any number of pieces of information to be utilized.

As explained above, according to the authentication information processing method of the invention, it is possible to exhibit such an excellent effect that the security for the log-in and the utility to the formal user can be maintained.

What is claimed is:

1. An authentication information processing method comprising:
    acquiring apparatus information of a user apparatus requesting a log-in;
    determining a log-in procedure to be applied to the user apparatus on the basis of the apparatus information;
    accepting a log-in operation from the user apparatus;
    judging, based on the determined log-in procedure and on the accepted log-in operation, whether the log-in from the user apparatus is permitted or not;
    storing a last log-in time from the user apparatus with the last log-in time related to the apparatus information;
    storing security level with the last log-in date related to the security level;
    storing an accumulated log-in count from the user apparatus with the log-in count related to the apparatus information; and
    determining a security level for the user apparatus by referring to at least an accumulated log-in count,
    wherein in determining the log-in procedure, the log-in procedure is determined by raising the security level when a period longer than a predetermined period has elapsed since the last log-in time,
    wherein in determining the log-in procedure, the log-in procedure is determined by lowering the security level when a number of days since the last log-in date is smaller than a predetermined small number of days,
    wherein in determining the log-in procedure, the log-in procedure is determined in accordance with the accumulated log-in count and the security level, and the security level is lowered when formal log-in procedure is repeated.

2. An authentication information processing device, comprising:

- an apparatus information acquiring module configured to acquire apparatus information of a user apparatus requesting a log-in;
- a log-in procedure determining module configured to determine a log-in procedure to be applied to the user apparatus on the basis of the apparatus information;
- a log-in accepting module configured to accept a log-in operation from the user apparatus;
- a log-in judging mod configured to judge, based on the determined log-in procedure and on the accepted log-in operation, whether the log-in from the user apparatus is permitted or not;
- a last log-in time storing module configured to store a last log-in time of the user apparatus, the last log-in time being related to the apparatus information;
- a security level storing module configured to store a security level with a last log-in date related to the security level;
- an accumulated log-in count storing module configured to store an accumulated log-in count from the user apparatus with the accumulated log-in count related to the apparatus information; and
- a security level determining module configured to determine a security level for the user apparatus by referring to at least an accumulated log-in count,
- wherein the log-in procedure judging module determines the log-in procedure by raising the security level when a period longer than a predetermined period has elapsed since the last log-in time,
- wherein in determining the log-in procedure, the log-in procedure is determined by lowering the security level when a number of days since the last log-in date is smaller than a predetermined small number of days,
- wherein the log-in procedure judging module determines the log-in procedure in accordance with the accumulated log-in count and the security level, and the security level is lowered when formal log-in procedure is repeated.

3. A storage medium that stored an authentication information processing program making a computer to execute a process authentication information, comprising:

- acquiring apparatus information of a user apparatus requesting a log-in;
- determining a log-in procedure to be applied to the user apparatus on the basis of the apparatus information;
- accepting a log-in operation from the user apparatus;
- judging, based on the determined log-in procedure and on the accepted log-in operation, whether the log-in from the user apparatus is permitted or not;
- storing a last log-in time from the user apparatus with the last log-in time related to the apparatus information;
- storing security level with the last log-in date related to the security level;
- storing an accumulated log-in count from the user apparatus with the log-in count related to the apparatus information; and
- determining a security level for the user apparatus by referring to at least an accumulated log-in count,
- wherein in determining the log-in procedure, the log-in procedure is determined by raising the security level when a period longer than a predetermined period has elapsed since the last log-in time,
- wherein in determining the log-in procedure, the log-in procedure is determined by lowering the security level when a number of days since the last log-in date is smaller than a predetermined small number of days,
- wherein in determining the log-in procedure, the log-in procedure is determined in accordance with the accumulated log-in count and the security level, and the security level is lowered when formal log-in procedure is repeated.

* * * * *